Patented Sept. 21, 1954

2,689,805

UNITED STATES PATENT OFFICE 2,689,805

METHOD OF COATING POLYTETRAFLUOROETHYLENE ARTICLES AND RESULTING ARTICLES

Martin W. Croze, Minneapolis, and Paul L. Hedrick, St. Paul, Minn., assignors to Minnesota Mining & Manufacturing Company, St. Paul, Minn., a corporation of Delaware No Drawing. Application June 30, 1952,
Serial No. 296,486

9 Claims. (Cl. 117—65)

This invention relates to a process for the preparation of unsupported continuous polytetrafluoroethylene film having a thin metallic layer permanently affixed to a surface thereof, and to the resulting coated film product.

Unsupported polytetrafluoroethylene films were first made by skiving or shaving thin films from massive sintered preforms or cylinders. Unsupported films have also been made by placing the polytetrafluoroethylene powder on a metal sheet or foil, sintering to form a self-supporting but un-oriented film, and then dissolving away the metal. More recently, oriented films having increased tensile strength have been made by sintering extruded or calendered thin films of the polymer. These films have found ready acceptance as high-temperature-resistant electrical insulation.

Bonding of metal directly to the sintered polytetrafluoroethylene film would have obvious utility in many electrical components, e. g. printed circuits, capacitors, etc. Hence many attempts have been made to provide adherent metal coatings on such films. One such attempt involves the deposition on the surface of the film of a mixture of metal particles and particles of unsintered polytetrafluoroethylene polymer, followed by heating. However such metallic coatings are necessarily quite thick, poorly conductive in comparison to the amount of metal present, and not readily removable. The dielectric strength per unit of film thickness is noticeably reduced. Nevertheless, so far as we are aware, such procedure provided the only known means, prior to our invention, of securely bonding metal to the smooth, waxy, and chemically inert surface of polytetrafluoroethylene film.

The present invention provides a means of bonding a thin conductive metal layer directly to the surface of polytetrafluoroethylene film. The metal is firmly bonded to the film. When a piece of pressure-sensitive adhesive tape is firmly pressed against the metal-coated surface and then stripped away, substantially all of the metal remains attached to the polytetrafluoroethylene. The dielectric strength per unit of film thickness is substantially identical with that of an uncoated film of the same over-all thickness. The metal coating can be easily and completely removed from specified areas as desired, and without injury to the underlying film.

These and other advantageous properties and results are attained, in accordance with the present invention, by procedures which will now be illustrated by means of specific but non-limitative examples.

Example 1

Polytetrafluoroethylene polymer, initially prepared in aqueous emulsion, is obtained as a soft white powdery material containing about 20–21 percent of a mineral oil lubricant. A typical commercial product which has been found suitable is the lubricated high-molecular-weight polytetrafluoroethylene extrusion paste available, at the filing date of this application, under the designation "TE-3060." The paste is extruded through a rigid die having a slot-shaped opening, under a pressure of 1200–1600 lbs./sq. in., by means of a ram-type extruder, to provide a smooth ribbon having a thickness of .035–.040 inch. The ribbon is passed between steel calender rolls heated to 150° F., where the caliper is reduced to .008–.0085 inch. Two or more ribbons may be superimposed and calendered simultaneously, and the resultant ribbons can be separated. The mineral oil lubricant is then extracted by passing the ribbon through a bath of trichloroethylene, residual solvent being removed by drying with warm air. The ribbon is white in color, and has a shiny surface and a soft waxy feel. It is low in tensile strength and highly stretchable, but is self-supporting. It is oriented in the direction of extrusion. The film is completely porous to trichloroethylene and other organic liquids as well as to water vapor and air.

The film is then placed in a vacuum chamber where the desired metal is volatilized and condensed on the film to form an extremely thin surface coating on the film. Gold is one example of a metal which has been thus vaporized and deposited, in films of the order of 500–1000 angstroms in thickness. At this stage, the gold is easily removed from the film by lightly brushing or rubbing the coated surface. The electrical conductivity of such a coating has not been satisfactorily measured, due to the difficulty of making satisfactory electrical contact without disrupting the coating.

The coated film is then heated to a sintering temperature, e. g. about 450° C., under tension sufficient to control shrinkage and wrinkling, and is tempered by quenching in water. The white, opaque, porous film is rendered clear or somewhat milky, the tensile strength and rigidity of the film are greatly increased, the film decreases in caliper and becomes non-porous and dense and the metallic coating is firmly bonded to the polytetrafluoroethylene surface as a conductive film. The electrical resistivity of such films has been measured as being in the neighborhood of 0.1–2.0 ohms per square.

Adhesives, electrical insulating waxes and potting compounds, varnishes, labels, etc. which are substantially completely non-adherent to untreated sintered polytetrafluoroethylene are found to adhere effectively to the metal-coated surfaces of the polymer. Heavier deposits of gold or other metals may be applied to the metallic surface where desired, to provide increased conductivity or other advantages; but with much thicker coatings, the stiffness of the metal tends to reduce the flexibility of the sheet and makes possible the separation of metal coating and polymer film on severe and continued folding or bending.

*Example 2*

In this example the unsintered polytetrafluoroethylene film, prepared as in Example 1 or by any other suitable method, is provided with a thin coating of copper applied in vapor form under vacuum, and the film is then heated and sintered while still under vacuum and while under tension sufficient to control shrinkage and wrinkling. Heat is then applied to the film by radiation from hot wires. The copper remains unchanged, and is found to provide a conductive and firmly bonded layer on the surface of the sintered and compacted film.

The bond obtained by heating under vacuum is somewhat superior to that obtained, as in Example 1, by heating in the presence of air. Furthermore the copper is protected from oxidation by this preferred procedure.

Additional amounts of copper or other metals may be added subsequently, by electroplating or other means. Solder may be directly fused to the copper coating, and copper conductors have been soldered thereto. The copper coating is firmly bonded to the polytetrafluoroethylene film but may be removed from specified areas by chemical action in providing printed circuits, condenser elements, test electrodes, etc. The coating may also be removed by electrical discharge. Alternatively the metal vapor may initially be applied through suitable screens or masks, or portions may be removed prior to heating and sintering. Scraping as a means of removing portions of the metal film after sintering is not necessary and is not recommended, since the sintered polytetrafluoroethylene film is itself damaged by such procedure due to the high degree of bonding between film and coating.

Films produced by extrusion of lubricated polytetrafluoroethylene paste as in the above specific examples are found to provide desirable properties and are preferred. These films are oriented during extrustion and after sintering are found to have surprisingly high tensile strength in the lengthwise direction, i. e. the direction in which extruded. They are smooth-surfaced and provide a highly satisfactory base surface for the metal coating. However, comparable unsintered polytetrafluoroethylene films produced by other methods are also useful. One such method involves heating and agitating a dispersion of tetrafluoroethylene under pressure in an aqueous solution of a saturated aliphatic dibasic peroxide catalyst to form the polymer in suspension, coagulating the polymer by addition of acetone, separating and drying the soft curd-like coagulum, forming the curds into a continuous soft self-supporting film by passing between pressure rolls, and then coating the film with metal in the form of vapor and sintering the film by heating to at least about 330° C., the sintering being preferably accomplished under vacuum.

A wide variety of metals are applicable to the procedures here described; among those which have successfully been applied and tested are gold, nickel, silver, copper, and aluminum. Only the noble metals are capable of withstanding the sintering operation in the presence of air, but all of the more common metals, including copper and aluminum, are suitable where the film is to be heated under vacuum. These metal coatings may subsequently be further treated, if desired, for a variety of purposes. For example, the aluminum coatings may be anodized for greatly improved bonding of organic adhesive, and may also be colored by suitable known techniques.

The principles of this invention are equally applicable to the coating of polytetrafluoroethylene shapes other than thin self-supporting films. Electrical conductors, such as copper cables, wires, or coils, which have been covered with an extruded or wrapped layer of unsintered polytetrafluoroethylene, may be provided with a thin conductive metal sheath by exactly analogous procedures, and the polymer then sintered; the metal coating is thereafter found to be firmly bonded to the insulating layer. Such metal coatings provide means for equalizing the electrical stresses occurring across the insulating layer, and for improving the adhesion between the insulating layer and insulating varnishes or potting compounds.

The extreme thinness of the conductive metallic layer, combined with its high degree of bonding to the polymer film, is important in the making of self-clearing capacitors.

Where polytetrafluoroethylene is specified herein, it will be understood that copolymers of tetrafluoroethylene together with small amounts of other copolymerizable monomers are equally applicable.

What is claimed is as follows:

1. The method of providing a thin, flexible, continuous, firmly bonded metallic coating on a surface of a sintered thin polytetrafluoroethylene film, comprising forming an unsintered self-supporting polytetrafluoroethylene film, placing said film under vacuum and depositing thereon, from vapor state, a thin continuous metallic coating non-fusing at the sintering temperature of the polytetrafluorethylene; and then heating and sintering the thus coated film without fusing said metallic coating.

2. The method of firmly bonding a thin conductive metal layer to a surface of a dense and non-porous sintered polytetrafluoroethylene article, comprising depositing a thin layer of metal from the vapor state in a vacuum on a surface of an unsintered pre-formed polytetrafluoroethylene article and then heating to sinter the polytetrafluoroethylene, said metal being a solid under the sintering conditions.

3. A metallized sintered polytetrafluoroethylene article prepared by the method of claim 2.

4. The method of providing a thin, flexible, firmly bonded conductive metallic coating on a surface of an oriented sintered polytetrafluoroethylene article, comprising forming an article of oriented unsintered polytetrafluoroethylene, placing said article under vacuum and depositing thereon, from vapor state, a thin metallic coating; non-fusing at the sintering temperature of the polytetrafluoroethylene, and heating and sintering the thus coated film while still under vacuum and without fusing said metallic coating.

5. The method of bonding an adhesive material to a surface of a sintered polytetrafluoroethylene article, said adhesive material being normally non-adherent to polytetrafluoroethylene, said method comprising depositing a thin coating of metal from the vapor state in a vacuum on a surface of an unsintered pre-formed polytetrafluoroethylene article, heating and sintering the thus coated article without fusing the metallic coating, and then adherently bonding the said adhesive material to the resulting metallized surface, said metal being a solid under the sintering conditions.

6. An article having an adhesive material, adherently bonded to a sintered polytetrafluoroethylene surface by means of an intervening thin metallic coating firmly bonded to said surface, said article being prepared by the method of claim 5.

7. The method of providing a thin, flexible, continuous, firmly bonded metallic coating on a surface of a sintered polytetrafluoroethylene article, comprising forming an article of unsintered polytetrafluoroethylene, coating a surface of said article with a thin continuous metallic coating deposited from vapor state and non-fusing at the sintering temperature of the polytetrafluoroethylene, and heating and sintering said polytetrafluoroethylene article without fusing said metallic coating.

8. The method of providing a thin, flexible, firmly bonded conductive metallic coating on a surface of a sintered polytetrafluoroethylene article, comprising placing under vacuum an article having a surface of unsintered polytetrafluoroethylene and depositing on said surface, from vapor state, a thin metallic coating non-fusing at the sintering temperature of the polytetrafluoroethylene, and heating and sintering the polytetrafluoroethylene while still under vacuum and without fusing said metallic coating.

9. The method of bonding to an article having a polytetrafluoroethylene component an adhesive material normally non-adherent to polytetrafluoroethylene, which comprises forming an article having at least a surface layer of unsintered polytetrafluoroethylene, coating at least a portion of said surface layer with a thin continuous metallic coating deposited from vapor state and non-fusing at the sintering temperature of the polytetrafluoroethylene, heating and sintering the unsintered polytetrafluoroethylene without fusing the metallic coating, and then adherently bonding the said adhesive material to the resulting metallized surface.

References Cited in the file of this patent

UNITED STATES PATENTS

| Number | Name | Date |
|---|---|---|
| 2,382,432 | McManus | Aug. 14, 1945 |
| 2,383,469 | Colbert | Aug. 28, 1945 |
| 2,456,262 | Fields | Dec. 14, 1948 |
| 2,484,484 | Berry | Oct. 11, 1949 |